(12) United States Patent
Ricketts et al.

(10) Patent No.: US 10,980,178 B2
(45) Date of Patent: Apr. 20, 2021

(54) SELF-ADJUSTING REEL ARMS FOR A REEL ASSEMBLY OF A HEADER OF AN AGRICULTURAL HARVESTER

(71) Applicant: CNH Industrial America LLC, New Holland, PA (US)

(72) Inventors: Jonathan E. Ricketts, Davenport, IA (US); Herbert M. Farley, Elizabethtown, PA (US); John Hinkle, York Springs, PA (US); Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 53 days.

(21) Appl. No.: 15/794,580

(22) Filed: Oct. 26, 2017

(65) Prior Publication Data

US 2019/0124842 A1 May 2, 2019

(51) Int. Cl.
*A01D 57/04* (2006.01)
*A01D 57/02* (2006.01)
(Continued)

(52) U.S. Cl.
CPC .............. *A01D 57/04* (2013.01); *A01D 34/04* (2013.01); *A01D 41/148* (2013.01); *A01D 57/02* (2013.01); *A01D 57/03* (2013.01)

(58) Field of Classification Search
CPC ...... A01D 34/04; A01D 41/148; A01D 41/08; A01D 41/10; A01D 41/14; A01D 41/141; A01D 41/142; A01D 57/02; A01D 57/03; A01D 57/04; A01D 57/025; A01D 43/00–16; A01D 65/00–08;
(Continued)

(56) References Cited

U.S. PATENT DOCUMENTS

| 1,271,803 A | * | 7/1918 | Thompson ............. A01D 57/04 56/226 |
| 1,492,311 A | * | 4/1924 | Parran Parsons ...... A01D 57/04 56/226 |

(Continued)

FOREIGN PATENT DOCUMENTS

| BE | 658860 | 5/1965 |
| CA | 2876686 A1 | 6/2016 |

(Continued)

OTHER PUBLICATIONS

International Search Report and Written Opinion for PCT/US2018/057617 dated Jan. 29, 2019 (11 pages).

*Primary Examiner* — Adam J Behrens
(74) *Attorney, Agent, or Firm* — Peter Zacharias; Patrick Sheldrake (57) ABSTRACT

A harvesting reel assembly for a header of an agricultural harvester is disclosed. The harvesting reel assembly includes a central rotatable shaft, a plurality of support members, a cam assembly and an extendable reel arm. The plurality of support members extend widthwise across the reel assembly and connect to the central rotatable shaft for rotation therewith. The cam assembly guides rotation of the plurality of support members. The extendable reel arm includes a first end engaged with the central rotatable shaft for rotation therewith. The extendable reel arm also includes a distal end opposite the first end connected to one of the plurality of support members.

20 Claims, 5 Drawing Sheets

(51) Int. Cl.
*A01D 34/04* (2006.01)
*A01D 41/14* (2006.01)
*A01D 57/03* (2006.01)

(58) Field of Classification Search
CPC .. A01D 84/00; A01D 84/02; A01D 78/00–20; A01D 89/00–008
See application file for complete search history.

(56) References Cited

U.S. PATENT DOCUMENTS

| | | | |
|---|---|---|---|
| 2,144,905 A * | 1/1939 | Wallace | A01D 57/04 56/226 |
| 2,489,516 A * | 11/1949 | Booth | A01D 57/04 56/226 |
| 3,358,429 A | 12/1967 | Claas | |
| 3,555,796 A | 1/1971 | Baumeister | |
| 4,008,558 A | 2/1977 | Mott | |
| 6,530,202 B1 | 3/2003 | Guyer | |
| 8,151,547 B2 | 4/2012 | Bich et al. | |
| 9,820,440 B2 * | 11/2017 | Jost | A01D 34/04 |
| 2015/0272003 A1 | 10/2015 | Honey et al. | |
| 2016/0183465 A1 * | 6/2016 | Honey | A01D 57/12 56/226 |
| 2017/0311546 A1 * | 11/2017 | Jost | A01D 57/03 |

FOREIGN PATENT DOCUMENTS

| | | | | |
|---|---|---|---|---|
| CN | 103875694 A | | 8/2014 | |
| FR | 713056 A | * | 10/1931 | ............ A01D 57/04 |
| WO | 2016199070 A1 | | 12/2016 | |

* cited by examiner

SELF-ADJUSTING REEL ARMS FOR A REEL ASSEMBLY OF A HEADER OF AN AGRICULTURAL HARVESTER

The present invention relates generally to a harvesting reel assembly for a header of a plant cutting machine (e.g., a combine harvester) and, more specifically, to a harvesting reel having extendable reel arms for tracking a cam track.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism for severing the plants or crops, such as an elongate sickle mechanism that reciprocates sidewardly relative to a non-reciprocating guard structure or a row unit with gathering chains and deck plates.

To facilitate the cutting and collection of crop material, the header also includes a harvesting reel. Harvesting reels, such as a pickup reel, a draper reel and a gathering reel, are used on agricultural harvesters to guide the crop to a cutting mechanism as well as onto a feeding apparatus. To facilitate collection, the reel includes a plurality of support members, i.e., tine bars, extending widthwise across the reel having tines extending outwardly therefrom to engage crop material as the tines are rotated about a rotational axis.

The subject disclosure used in combination with an agricultural harvester provides a reel assembly having an extendable reel arm that can move to facilitate tracking a non-circular cam track as the reel assembly rotates about a rotational axis.

BRIEF SUMMARY OF THE INVENTION

In accordance with an exemplary embodiment of the subject disclosure there is provided a harvesting reel assembly for a header of an agricultural harvester comprising a central rotatable shaft, a plurality of support members, a cam assembly and an extendable reel arm. The plurality of support members extend widthwise across the reel assembly and connect to the central rotatable shaft for rotation therewith. The cam assembly guides rotation of the plurality of support members. The extendable reel arm includes a first end and a distal end. The first end is engaged with the central rotatable shaft for rotation therewith. The distal end is opposite the first end and is connected to one of the plurality of support members.

An aspect of the exemplary embodiment is that the harvesting reel assembly further comprises a plurality of extendable reel arms each including a first end engaged with the central rotatable shaft for rotation therewith and a distal end opposite the first end for connection to one of the plurality of support members. The extendable reel arm moves between an extended position and a retracted position in response to engagement with the cam assembly. The extendable reel arm includes at least one of an actuator, a biasing member, and a cylinder.

Another aspect of the exemplary embodiment is that the extendable reel arm further includes a cam wheel engaging a cam track of the cam assembly. The cam wheel is positioned on the distal end of the extendable reel arm. Each of the plurality of support members are operatively engaged with the cam track.

Yet another aspect of the exemplary embodiment is that the extendable reel arm includes a pair of telescoping members. Alternatively, the extendable reel arm includes a first member slidably engaged with a second member forming a slidably extendable reel arm. The first and second members can be cylindrical members. The extendable reel arm includes a slot extending through a lateral side of each of the first and second members. The extendable reel arm also includes a roller slidably engaging the slot of each of the first and second members. The extendable reel arm also includes a stop engaging the slot of each of the first and second members.

Another aspect of the exemplary embodiment is that the harvesting reel assembly further comprises a pressure source. The pressure source is one of an air tank, a gas cylinder and an accumulator operatively engaged with the extendable reel arm for extending the extendable reel arm. The accumulator is adjacent to the central rotatable shaft. The harvesting reel assembly further comprises a plurality of extendable reel arms circumferentially spaced apart from each other and in communication with the accumulator. The accumulator and the plurality of extendable reel arms maintain a substantially fixed pressure in a cavity extending between the plurality of extendable reel arms. The cam assembly includes a non-circular cam track. The harvesting reel assembly can further comprise a biasing member for extending or retracting the extendable reel arm. The harvesting reel assembly can also comprise an extendable spider arm extending between the central rotatable shaft and one of the plurality of support members.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the disclosure, will be better understood when read in conjunction with the appended drawings. For the purpose of illustration, there are shown in the drawings exemplary embodiments. It should be understood, however, that the disclosure is not limited to the precise arrangements and instrumentalities shown.

In the drawings.

DETAILED DESCRIPTION OF THE INVENTION

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject disclosure is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the subject disclosure can be presented in a range format. It should be understood that the description in range format is merely for convenience and brevity and should not be construed as an inflexible limitation on the scope of the exemplary embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments may be combined in any suitable manner in one or more embodiments. One skilled in the relevant art will recognize, in light of the description herein, that the exemplary embodiments can be practiced without one or more of the specific features or advantages of a particular exemplary embodiment. In other instances, additional features and advantages may be recognized in certain embodiments that may not be present in all exemplary embodiments of the subject disclosure.

Additionally, for convenience purposes only, elements of the exemplary embodiments, such as a plurality of support members 204A, 204B, 204C, 204D, 204E, 204F may be described with reference to only one of those elements, such as the support member 204A. It is appreciated therefore that the description of one element is equally applicable to the remainder of the same elements. Identical elements, or substantially identical elements where so indicated, will be identified, where appropriate, by the same reference numeral, e.g., 204, and distinguished by an alphabetical letter, e.g., A, B, C, D, E, F, etc. For example, the support member 204A is one of the support members, the support member 204B is another of the support members, the support member 204C is yet another of the support members, and so forth.

Referring now to the drawings, FIGS. 1-5B illustrate an agricultural harvester 100 in accordance with an exemplary embodiment. For exemplary purposes only, the agricultural harvester is illustrated as a combine harvester. The harvester 100 includes a header 102 comprising a frame 104 and a harvesting reel assembly 200 having a central rotatable shaft 202, the support member 204A, a cam assembly 206A and an extendable reel arm 300A.

Figure 1:
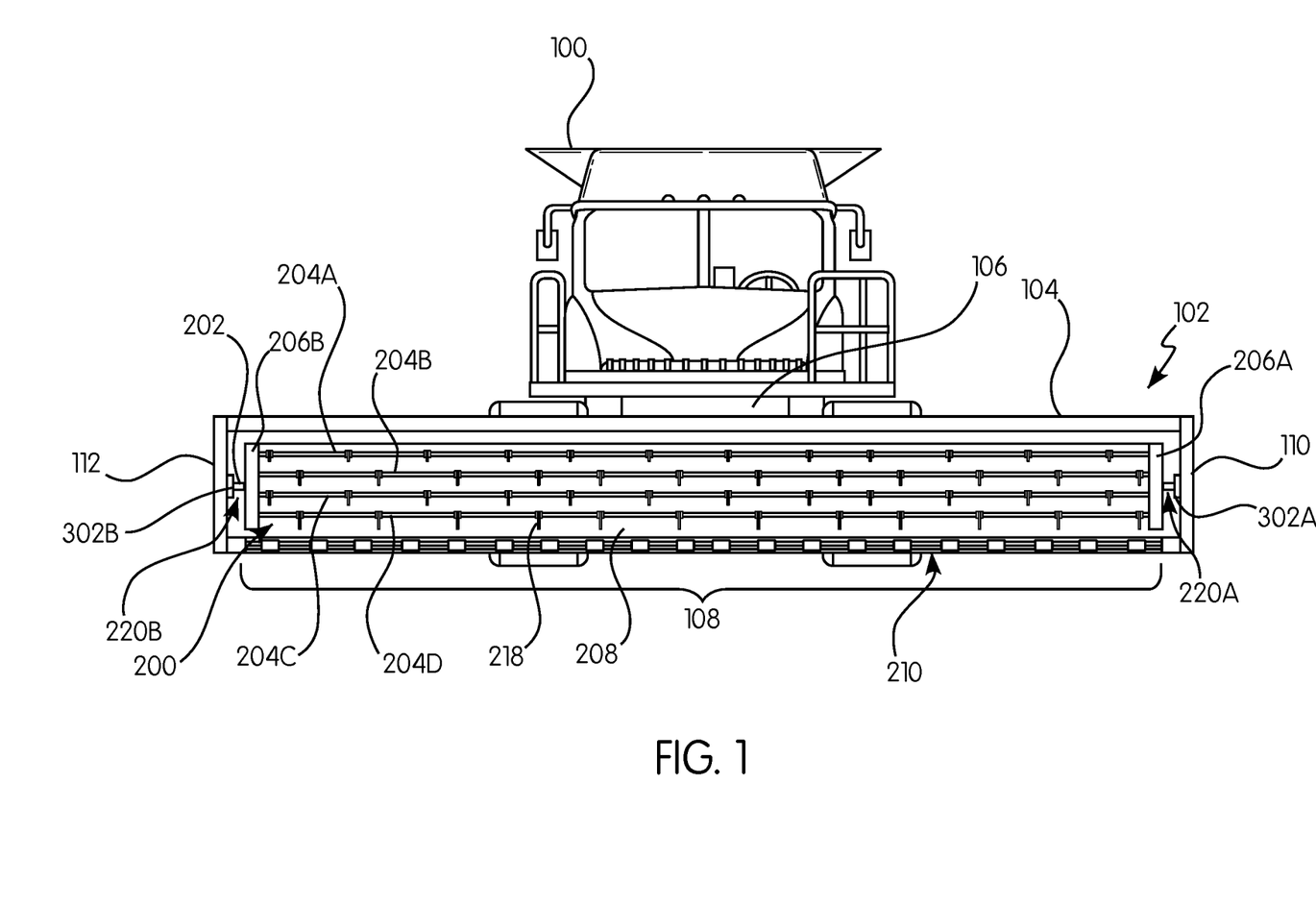
FIG. 1 is a front elevational view of an agricultural harvester including a header in accordance with an exemplary embodiment.
Figure 2:
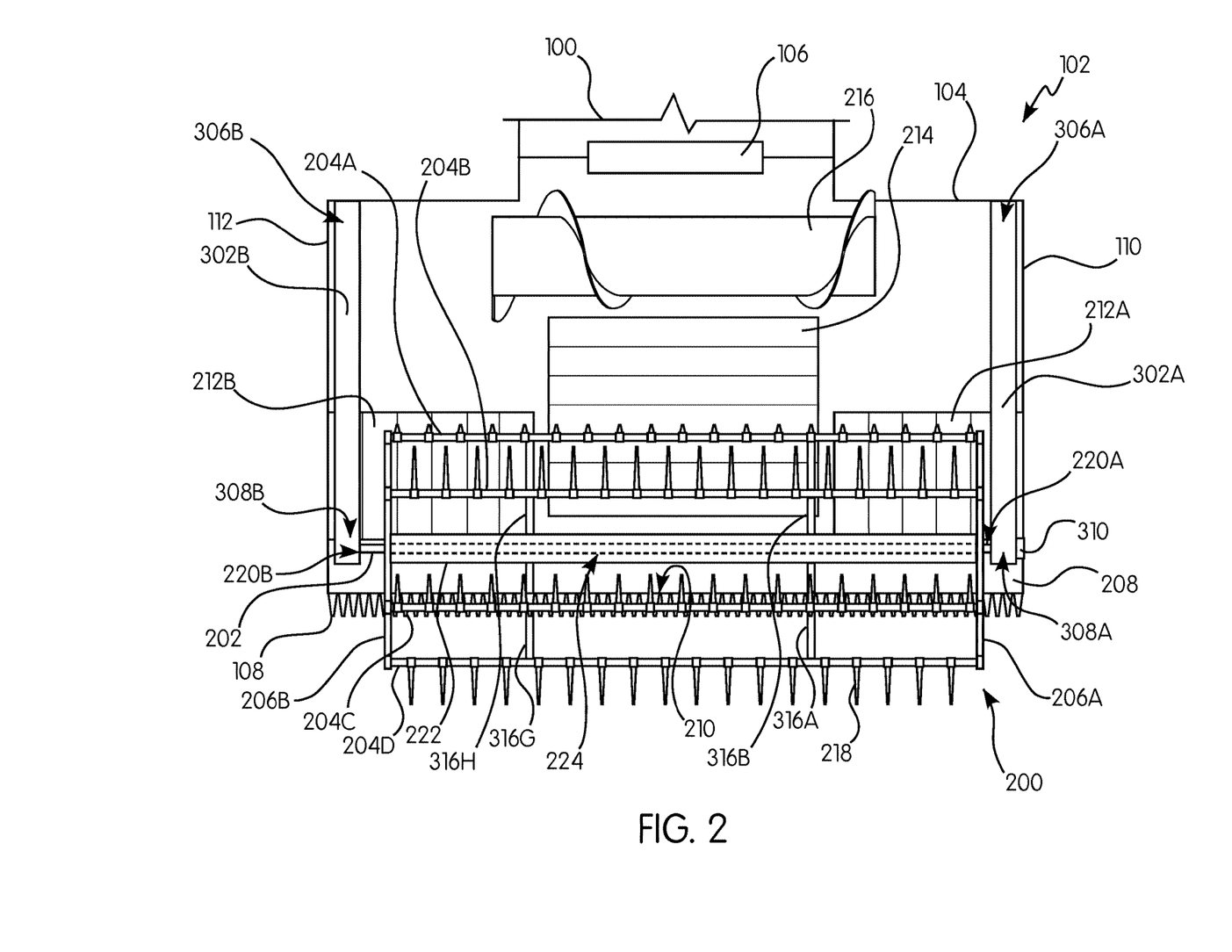
FIG. 2 is a schematic top plan view of the header of FIG. 1 in accordance with an aspect of the exemplary embodiment.

Referring now to FIGS. 1 and 2, the frame 104 is the structural chassis of the header 102 and allows for the various components of the header 102 to be attached thereto. The header 102 is attached to a forward end of the harvester 100, and is configured to cut crops, including (without limitation) small grains (e.g., wheat, soybeans, grain, etc.), and to induct the cut crops into a feederhouse 106 as the harvester 100 moves forward over a crop field.

The header 102 includes a floor 208 that is supported in desired proximity to a surface of a crop field and a cutter bar 108. The cutter bar 108 of the header 102 extends transversely along a forward edge 210 of the floor 208 i.e., in a widthwise direction of the harvester 100, and is bound by a first side edge 110 and an opposing second side edge 112, which are both adjacent to the floor 208. The cutter bar 108 is configured to cut crops in preparation for induction into the feederhouse 106. It is appreciated that the cutter bar 108 includes one or more reciprocating sickles such as those disclosed in U.S. Pat. No. 8,151,547, the entire disclosure of which is incorporated herein by reference for all purposes.

The elongated and rotatable harvesting reel assembly 200 extends above and in close proximity to the cutter bar 108. The harvesting reel assembly 200 is configured to cooperate with a plurality of draper belts, such as lateral draper belts 212A, 212B and an infeed draper belt 214, for conveying cut crops to the feederhouse 106. The draper belts 212A, 212B, 214 are configured to convey the cut crops into the harvester 100, and, more specifically, towards the feederhouse 106 for threshing and cleaning. The header 102 may include a rotatable auger 216, e.g., a conveyor screw, to facilitate feeding into the feederhouse 106. While the foregoing aspects of the harvester 100 are being described with respect to the header 102 shown, the harvesting reel assembly 200 of the subject disclosure can be applied to any other header having use for such a reel assembly.

Figure 3A:
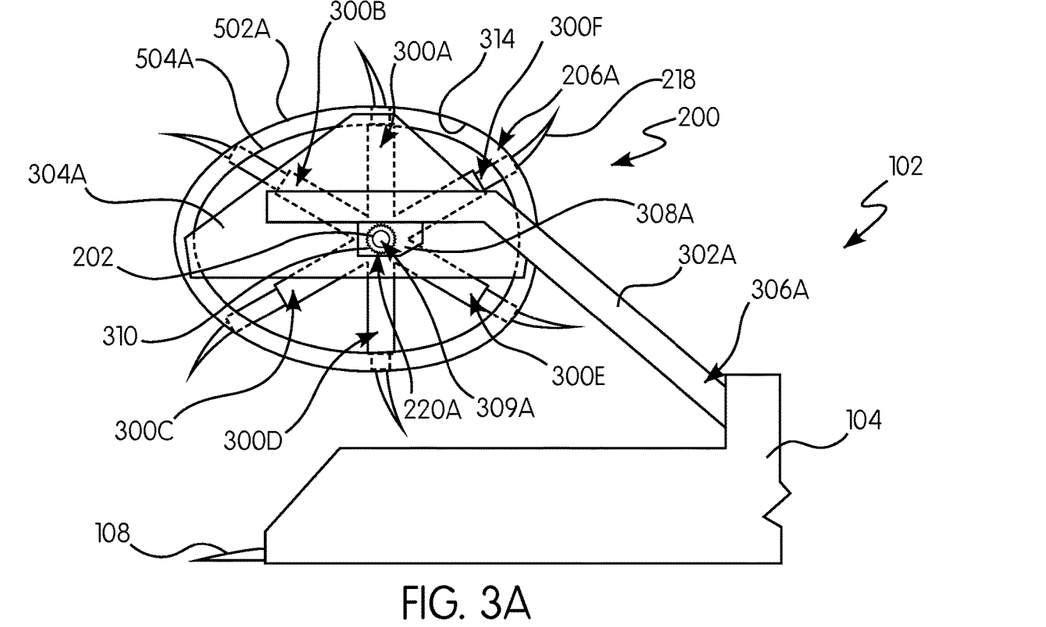
FIG. 3A is a right side elevational view of the header of FIG. 1 in accordance with an aspect of the exemplary embodiment.
Figure 3B:
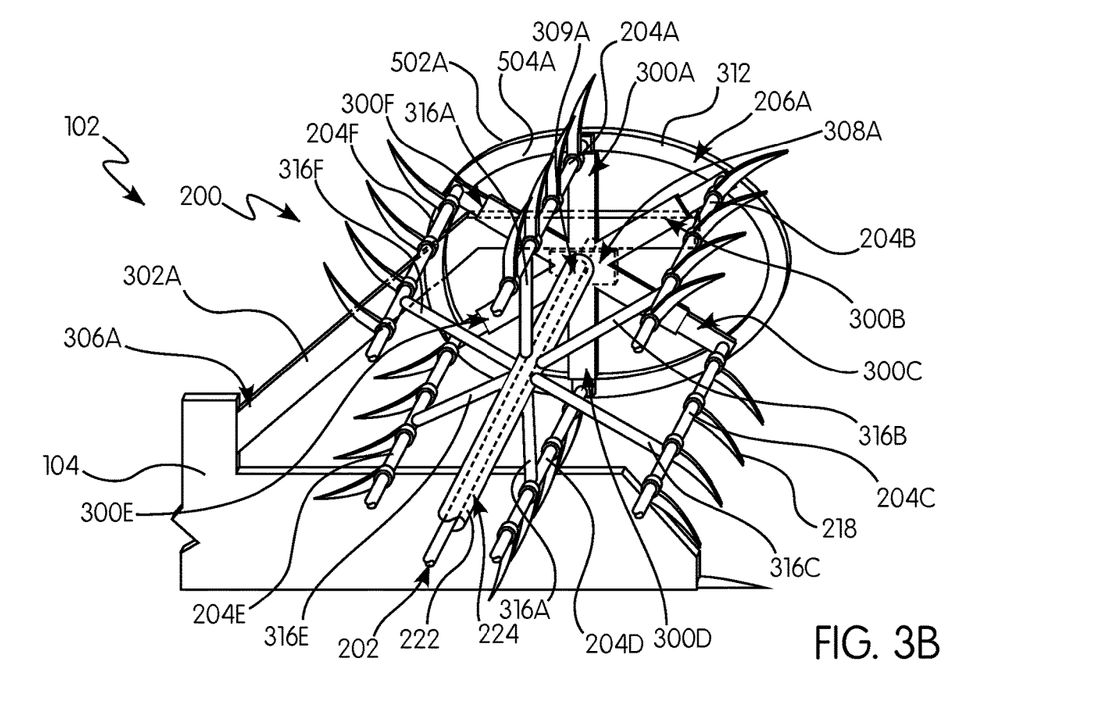
FIG. 3B is a partial top perspective view of a right side of the header of FIG. 1 with a cam plate omitted for clarity in accordance with an aspect of the exemplary embodiment.

It is appreciated that, for convenience purposes only, the harvesting reel assembly 200 may be described in reference to only one side, e.g., a right side, as shown in FIGS. 3A and 3B. It is understood that, unless otherwise specified, the left side of the harvesting reel assembly 200 is substantially structurally similar to the right side. In other words, the left side of the harvesting reel assembly 200 is a mirror image-like configuration of the right side of the harvesting reel assembly 200.

Referring now to FIGS. 1-5B, the harvesting reel assembly 200 is configured substantially as shown. The harvesting reel assembly 200 is an elongated cylindrical assembly rotatably attached to the side edges 110, 112 and more specifically to a pair of support arms 302A, 302B extending forwardly from the frame 104. The rotatable reel 120 is positioned above and parallel to the cutter bar 108 and is rotatable in a direction suitable for facilitating the induction of cut crops onto the draper belts 212A, 212B, 214. The harvesting reel assembly 200 includes the support arm 302A, the central rotatable shaft 202, the support member 204A, a plurality of tines 218, the extendable reel arm 300A, the cam assembly 206A and a cam wheel 500A.

Referring now to FIGS. 1-3B, the support arm 302A is configured substantially as shown. The support arm 302A is an elongated member having a first end 306A and a mounting portion 308A for supporting the harvesting reel assembly 200. The first end 306A is configured to be securable to the frame 104 either rigidly or pivotally, e.g., via a pivot joint using screws, welding, pins, being integrally formed and so forth. The mounting portion 308A is located along a length of the support arm 302A and is configured to be engaged by the central rotatable shaft 202 via, e.g., a combination of bushings and bearings, such that the central rotatable shaft 202 is rotatable within. In an exemplary embodiment, the mounting portion 308A includes an aperture 309A for receiving the central rotatable shaft 202. It is appreciated that the support arm 302A may be a unitary member or may be a series of interconnected members for supporting the reel assembly 200. Additionally, it is appreciated that the support arm 302A can be substantially linear, angled or curved as necessary for efficient operation.

The support arm 302 further includes a drive mechanism 310 adjacent to the mounting portion 308A and connectable to the central rotatable shaft 202 for providing rotational motion thereto. The drive mechanism 310 can be, e.g., a hydraulic motor, a gear train or other such drive mechanisms as are known in the art. Such drive mechanisms 310 are known in the art and do not necessitate extensive discussion for the purposes of the subject disclosure.

Referring now to FIGS. 2-3B, the central rotatable shaft 202 is configured substantially as shown. In an exemplary embodiment, the central rotatable shaft 202 is an elongated rotatable member shaped as, e.g., a substantially cylindrical member. It is appreciated that the central rotatable shaft 202 can take any other longitudinal cross-sectional shapes such as squares, ovals, and so forth. The central rotatable shaft 202 includes a first end 220A configured to engage the drive mechanism 310 and the mounting portion 308A of the support arm 302A, and a second end 220B opposite the first end configured to be connectable to a mounting portion 308B of another support arm 302B.

The central rotatable shaft 202 further includes an outer portion 222 circumscribing the central rotatable shaft 202. The outer portion 222 defines a cavity 224 within which the central rotatable shaft 202 is received. The cavity 224 can be sized to house other elements of the subject disclosure such as hydraulic tubes, motors, springs, accumulators, and so forth, as is described in greater detail below. It is appreciated that the cavity 224 does not need to extend along a full length of the central rotatable shaft 202 but instead may be sectional or segmented into pockets along the length of the central rotatable shaft 202. For example, the cavity 224 may be below and/or in communication with the extendable reel arm 300A.

Referring to FIGS. 1-3B, the support member 204A, e.g., a tine bar, is configured substantially as shown. The support member 204A is an elongated member extending widthwise across the harvesting reel assembly 200. The support member 204A is rigidly connectable to the extendable reel arm 300A at an end of the support member 204A. Such connection can be achieved by way of fasteners, including, e.g., screws, nuts, welding and so forth. As such, the support member 204A is configured to rotate about the central rotatable shaft 202 with the extendable reel arm 300A.

Extending from the support member 204A at a plurality of positions along a length of the support member 204A are the plurality of tines 218, configured substantially as shown in FIGS. 1-3B. The tines 218 are curved elongated members having an arched or a curvilinear configuration for grasping crop material. The tines 218 are configured to rigidly connect to the support member 204A via fasteners, including, e.g., welding, screws, complementary shaped slots, rivets, force fit members, being integrally formed and so forth.

It is appreciated that any number of support members and tines may be used. Thus, the present disclosure is not limited to a specific number of tines as depicted in the drawings.

Referring now to the exemplary embodiments shown in FIGS. 3A-5C, the extendable reel arm 300A is configured substantially as shown. The extendable reel arm 300A includes a housing 400A and a movable shaft 402A, i.e., a first member, extendable from the housing 400A, i.e., a second member. In an exemplary embodiment, the housing 400A and the movable shaft 402A are complementary shaped members configured to slidably and/or adjustably engage one another.

Figure 4A:
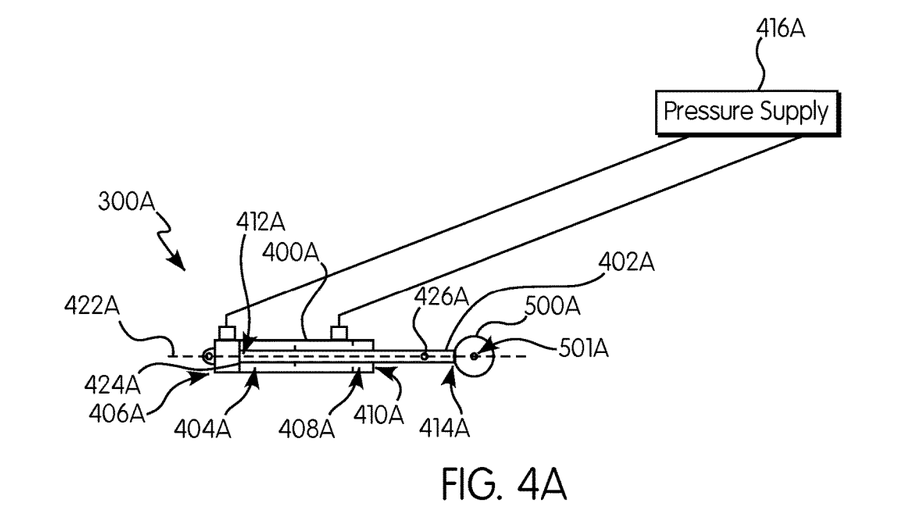
FIG. 4A is a schematic view of an exemplary extendable reel arm in accordance with an aspect of an exemplary embodiment.

The housing 400A has a first end 406A and a distal end 408A. The housing 400A defines a cavity 404A having an opening 410A at the distal end 408A for the movable shaft 402A to slide within and through, respectively. The first end 406A is configured to attach to the central rotatable shaft 202 via, e.g., welding, pins, screws, and so forth. In an exemplary embodiment, the extendable reel arm 300A is in fluid communication with the cavity 224 of the central rotatable shaft 202 via, e.g., an opening at about the first end 406A leading into the cavity 224 of the central rotatable shaft 202. In an exemplary embodiment, the housing 400A and the cavity 404A have a cylindrical shape, but it is appreciated that they can be any other shapes suitable for their intended purpose such as rectangular prisms and the like.

The movable shaft 402A is sized and shaped to be slidably received within the cavity 404A of the housing 400A. The movable shaft 402A includes a proximal end 412A and a distal end 414A. The proximal end 412A is configured slide within the cavity 404A and be pushed/pulled towards/away from the opening 410A. The distal end 414A includes a fastener 501A for connecting to the cam wheel 500A for engaging the cam assembly 206A. Additionally, the extendable reel arm 300A may include a stop 424A at or near the proximal end 412A to prevent the movable shaft from completely passing through the opening 410A of the housing 400A. Further, the movable shaft 402A includes a fastener 426A at or about the distal end 414A for securing the support member 204A thereto. The fastener 426A can include, e.g., screws, welding, being integrally formed and so forth.

It is appreciated that the housing 400A and the movable shaft 402A may be distinct members or may be mechanically coupled with one another in, e.g., a telescoping fashion, whereby the extendable reel arm 300A has a movable portion with respect to a relative stationary portion. In other words, the extendable reel arm includes a pair of telescoping members, or the extendable reel arm includes first and second members, e.g., complementary shaped members, forming a slidably extendable reel arm. For example, the first member can be a cylindrical member and the second member can be a tubular member.

The housing 400A and the movable shaft 402A can also include appropriate bearings and bushings to facilitate sliding between each other. As such, the movable shaft 402A can move from a retracted position (e.g., most inwardly into the cavity 224) to an extended position (e.g., most outwardly from the cavity 224). Specifically, the movable shaft 402A is extendable inwardly and outwardly along a longitudinal axis 422A of the housing 400A and into the housing 400A. In other words, the extendable reel arm 300A defines a longitudinal axis 422A, and the distal end 414A extends and retracts along the longitudinal axis 422A or along a path parallel thereto.

It is appreciated that any number of extendable reel arms 300A, e.g., extendable reel arms 300A-F, may be used to in conjunction with any number of support members 204A, e.g., support members 204A-F.

In an exemplary embodiment as shown in FIG. 4A, the extendable reel arm 300A is a hydraulically powered reel arm. For example, the extendable reel arm 300A includes a pressure source 416A that is powered to provide a working pressure for extending the movable shaft 402A. The pressure source 416A provides constant pressure against the proximal end 412A of the movable shaft 402A to push the movable shaft 402A towards the opening 410A. The pressure source 416A may be, e.g., an air cylinder, an actuator, an accumulator or the like. The pressure source 416A may also be timed to provide and/or not provide a pressure against the proximal end 412A based on a rotational position of the central rotatable shaft 202, e.g., on a rotational position of the extendable reel arm 300A along the cam assembly 206A.

In accordance with another exemplary embodiment, the extendable reel arms 300A-F can be configured to be in communication with the cavity 224 of the central rotatable shaft 202 for maintaining a substantially fixed pressure in the cavity 224 between the extendable reel arms 300A-F, e.g., by forming a closed pressure circuit. In other words, as one of the movable shafts 402A-F of the extendable reel arms 300A-F moves outwardly from the its respective opening 410A-F, another of the movable shafts 402A-F would be forced to move inwardly into its respective opening 410A-F to maintain equal pressure in the cavity 224 and the extendable reel arms 300A-F. Additionally, the cavity 224 can also include the pressure source 416A to facilitate maintaining the internal pressure within the cavity 224 and the extendable reel arms 300A-F in a constant state by compensating for any pressure losses during operation of the extendable reel arms 300A-F.

In other words, the harvesting reel assembly further comprises a pressure source wherein the pressure source is one of an air tank, a gas cylinder and an accumulator in communication with the extendable reel arm for extending the extendable reel arm. The accumulator is adjacent to the central rotatable shaft. The harvesting reel assembly further comprises a plurality of extendable reel arms circumferentially spaced apart from each other and in communication with a pressure source, e.g., an accumulator. The accumulator and the plurality of extendable reel arms maintain a substantially fixed pressure in a cavity extending between the pluralities of extendable reel arms. In an exemplary embodiment, the plurality of extendable reel arms consist essentially of pairs of extendable reel arms extending from the central rotatable shaft in opposite directions.

Figure 4B:
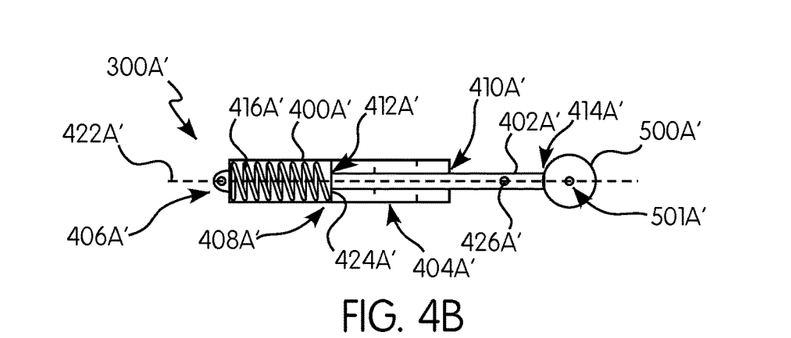
FIG. 4B is a schematic view of another exemplary extendable reel arm in accordance with an aspect of an exemplary embodiment.

In another exemplary embodiment as shown in FIG. 4B, an extendable reel arm 300A' may include a biasing member 416A' extending between a proximal end 412A' of a movable shaft 402A' and a first end 406A' of a housing 400A'. The biasing member 416A' can be for example a magnet (e.g., a magnet shaped as shown in FIG. 4B), a spring, such as a compression spring, an extension spring, a constant force spring, or other elements capable of providing a reactive force to counteract motion of the proximal end 412A' of the movable shaft 402A' relative to the first end 406A' of the housing 400A'.

In other words, the extendable reel arm includes at least one of an actuator, a biasing member, and a cylinder, or combinations thereof. Specifically, the harvesting reel assembly further comprises a basing member 416A' for extending or retracting the extendable reel arm.

Figure 4C:
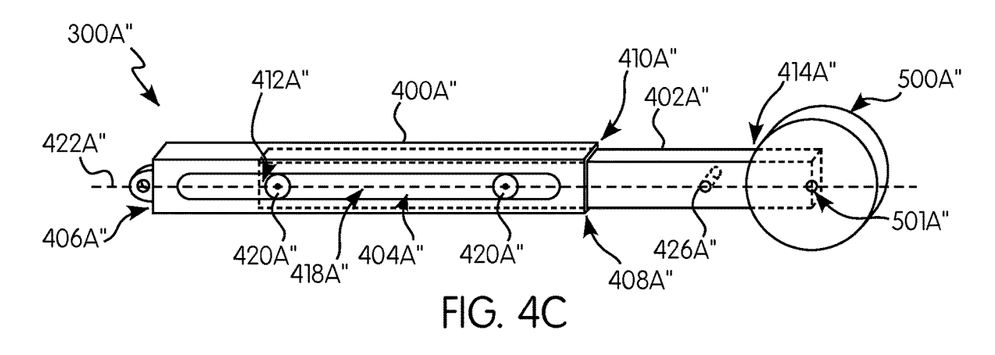
FIG. 4C is a schematic view of another exemplary extendable reel arm in accordance with an aspect of an exemplary embodiment.

In yet another exemplary embodiment as shown in FIG. 4C, an extendable reel arm 300A" may not include a pressure source, but instead be connectable to the cam assembly 206A via the cam wheel 500A such that movement along the cam assembly 206A pushes/pulls a movable shaft 402A" to match a cam wheel 500A as the cam wheel 500A travels along the non-circular cam assembly 206A. The extendable reel arm 300A" can further include a slot 418A" formed on the housing 400A" and a pair of wheels 420A" connected to the movable shaft 402A" and slidably engaged with the slot 418A" for facilitating the movable shaft 402A" sliding in and out of a cavity 404A". It is appreciated that the housing 400A" and movable shaft 402A" can have any number of slots and wheels, e.g., an identical slot and pair of wheels on an opposite side of the housing 400A" and movable shaft 402A, respectively, without departing from the scope of the present disclosure. It is also appreciated that the movable shaft 402A" can also include a slot similar to the slot 418A" on an opposing side of the housing 400A" whereby the wheels 420A" are engaged thereto. Additionally, it is appreciated that the extendable reel arm 300A" can also include a stop for limiting the range of motion of the wheel 420" within the slot 418A". For example, the stop may be an edge of the slot 418A" or may be a member extending from the housing 400A" into the slot 418A".

In other words, the extendable reel arm includes a pair of slots each extending through a lateral side of each of the first and second members, i.e., the housing 400A" and the movable shaft 402A". Further, the extendable reel arm includes a roller, e.g., the wheel 420A", slidably engaging the slots of each of the first and second members.

Referring now to FIGS. 2 and 3B, an exemplary embodiment may further include an extendable spider arm 316A configured substantially similar to the extendable reel arm 300A described above. As such, the extendable spider arm 316A is configured to extend from the central rotatable shaft 202 and connect to one of the plurality of support members 204A for supporting the support members therewith. In an exemplary embodiment, the spider arm extends from the central rotatable shaft 202 at a point between the cam assemblies 206A, 206B. In other words, the harvesting reel assembly 200 further comprises an extendable spider arm extending between the central rotatable shaft and one of the plurality of support members.

Figure 5A:
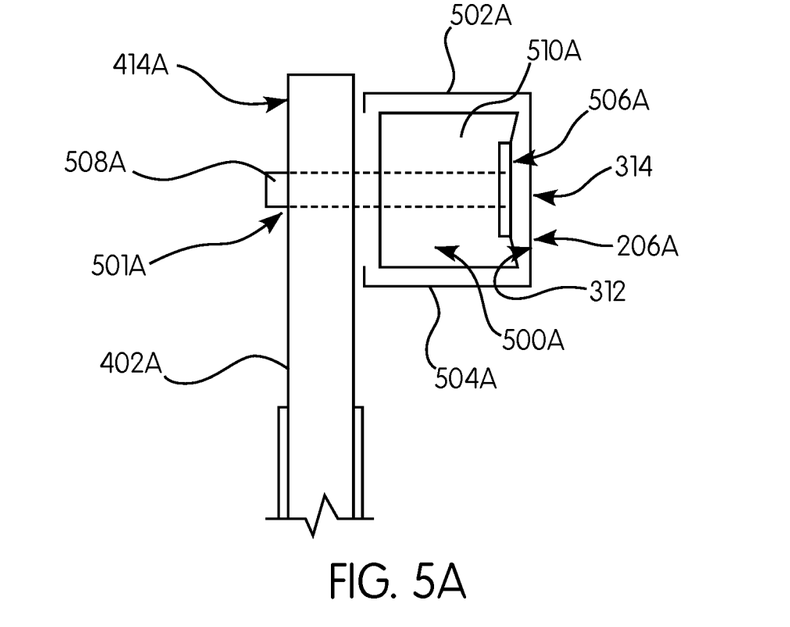
FIG. 5A is a schematic view of an exemplary cam wheel in accordance with an aspect of an exemplary embodiment.
Figure 5B:
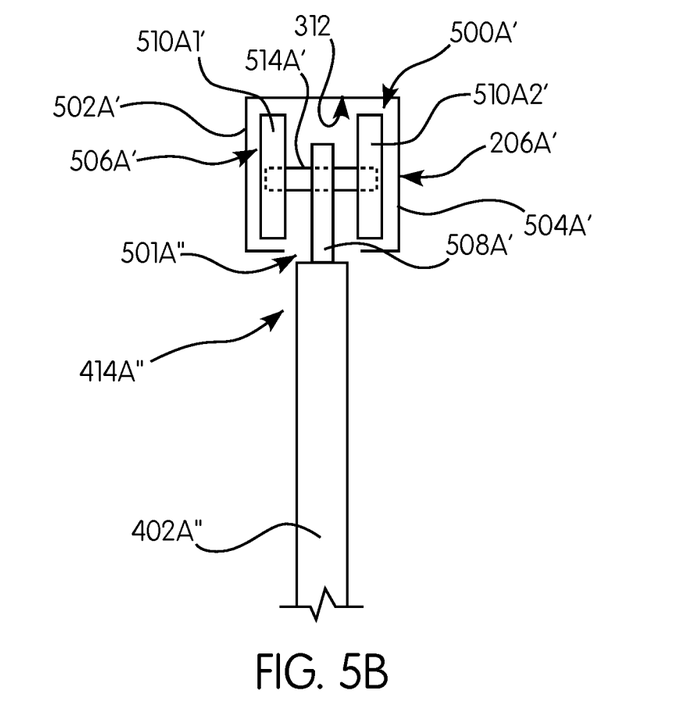
FIG. 5B is a schematic view of another exemplary cam wheel in accordance with an aspect of an exemplary embodiment.

Referring now to FIG. 5A, the cam wheel 500A is configured substantially as shown. In an exemplary embodiment, the cam wheel 500A includes a shaft 508A for connecting to a lateral side of the movable shaft 402A of the extendable reel arm 300A, and a wheel 510A rotatably circumscribing the shaft 508A for engaging with a cam track 506A. In an alternate embodiment, as shown in FIG. 5B, the cam wheel 500A' includes a shaft 508A' connected to a distal end of the movable shaft 402A", a cross shaft 514A' connected to the shaft 508A', and a set of wheels 510A1', 510A2' rotatably circumscribing the cross shaft 514A' at opposite ends of the cross shaft 514A' and engagable with a cam track 506A'. It is appreciated that the cam wheels 500A, 500A' additionally include bushings or bearings to facilitate appropriate rotational motion.

Referring now to FIGS. 1-3B, 5A and 5B the cam assembly 206A is configured substantially as shown. The cam assembly 206A forms a guide or path that the extendable reel arm 300A, and by extension the support member 204A, follows as it is rotated about the central rotatable shaft 202. In an exemplary embodiment, the cam assembly 206A is a non-circular, e.g., oval, member or series of members defining a non-circular ring configured to be engagable by the cam wheel 500A. Specifically, the cam assembly 206A includes an inner ring portion 504A and an outer ring portion 502A extending forwardly from a lateral side 312 of the cam assembly 206A and defining the cam track 506A for the cam wheel 500A to engage. Alternatively, the cam assembly 206A' may instead have opposing lateral ring portions 502A', 504A' (FIG. 5B) extending forwardly from an inner side of the cam assembly 206A' and defining the cam track 506A' for the cam wheel 500A' to engage. In other words, the cam assembly 206A, 206A' includes a non-circular cam track 506A, 506A'.

The cam assembly 206A may be held together in a specific non-circular orientation by a cam plate 304A, as shown in FIGS. 3A-3B. The cam plate 304A is a substantially planar member rigidly connected to a lateral side 314 of the cam assembly 206A by way of a fastener including, e.g., screws or welding. The cam plate 304A may also include appropriate apertures and/or bearings for facilitating the passage and operation of the central rotatable shaft 202 to the mounting portion 308A of the support arm 302A.

Referring now to FIGS. 1-4C, the frame 104 of the header 102 is operatively connected to the harvester 100. The harvesting reel assembly 200 extends widthwise across the header 102 above the forward edge 210 and is supported by the support arms 302A, 302B. The support arms 302A, 302B extend forwardly from the frame 104 at their first end 306A, 306B and are adjacent to the first and second side edges 110, 112, respectively. The central rotatable shaft 202 extends widthwise across the header 102 and is rotatably connected to the mounting portion 308A of the support arm 302A. The central rotatable shaft 202 is rotatably driven by the drive mechanism 310 for rotation therewith.

The extendable reel arms 300A-F extend from the outer portion 222 of the central rotational shaft 202. The extendable reel arms 300A-F are connected to the cam assembly 206A via the cam wheel 500A such that the cam wheel 500A tracks the cam track 506A of the cam assembly 206A as the central rotatable shaft 202 is rotated. The support members 204A-F are rigidly connected to the respective movable shafts 402A-F of the extendable reel arms 300A-F at or about the distal ends 414A-F.

In exemplary embodiments, the extendable reel arms 300A-F include pressure sources 416A-F for facilitating the sliding motion of the movable shafts 402A-F within the housing 400A when tracking the cam assembly 206A. Such pressure sources 416A-F may be operatively attached to the extendable reel arms 300A-F, be within the housings 400A-F, or may be within the cavity 224 of the outer portion 222 of the central rotatable shaft 202, as described above.

In other words, the harvesting reel assembly comprises a central rotatable shaft; a plurality of support members extending widthwise across the reel assembly and connected to the central rotatable shaft for rotation therewith; a cam assembly for guiding rotation of the plurality of support members; and an extendable reel arm that includes a first end engaged with the central rotatable shaft for rotation therewith and a distal end opposite the first end for connection to one of the plurality of support members. The harvesting reel assembly further comprises a plurality of extendable reel arms each including a first end engaged with the central rotatable shaft for rotation therewith and a distal end opposite the first end for connection to one of the plurality of support members.

Additionally, the extendable reel arm 300A further includes a cam wheel 500A engaging a cam track 506A of the cam assembly 206A. Furthermore, the cam wheel 500A is positioned on the distal end 414A of the extendable reel arm 300A. Thus, each of the plurality of support members 402A-F are positioned along/operatively engaged with the cam track 506A.

An exemplary embodiment of the subject disclosure operates by having the extendable reel arms 300A-F extend or retract to match the non-circular cam path of the cam assembly 206A as the central rotatable shaft 202 is rotated. Specifically, as the central rotatable shaft 202 is rotated, the central rotatable shaft 202 travels along a rotational path set by the cam assembly 206A. Because the cam assembly 206A is non-circular, the changing radius of the cam assembly 206A requires the extendable reel arms 300A-F to extend and/or retract to accommodate the change. As such, the movable shafts 402A-F are either pulled or pushed out from the housing 400A as the cam wheel 500A travels along the cam assembly 206A. In some exemplary embodiments, the movable shafts 402A-F, 402A'-F' are pushed outward via a pressure or other force based mechanism. In other exemplary embodiments, the movable shafts 402A"-F" are pulled outward or pushed inwardly as the cam wheel 500A, 500A' travels along the cam track 506A, 506A' as the central rotatable shaft 202 rotates. Thus, the support members 402A-F connected to the extendable reel arms 300A-F travel in a non-circular path as they are rotated about the central rotatable shaft 202. In other words, the extendable reel arm moves between an extended position and a retracted position in response to operative engagement with the cam assembly.

The advantages of a header having a harvesting reel assembly having extendable reel arms are apparent. Specifically, support members having a non-circular travel path can reach further passed the forward edge of the harvester compared to support members having a circular travel path. Consequently, crops can more effectively and efficiently be grasped, cut and collected. The exemplary embodiments are a simple and easy to install design for an extendable reel arm that can be attached to any sized cam assembly. Further, the design allows for dimensions of the cam assembly to be altered and changed without needing new extendable reel arms.

While the subject disclosure has been described with reference to exemplary embodiments, it will be appreciated by those skilled in the art that various changes may be made and equivalents may be substituted for elements thereof without departing from the scope of the subject disclosure. For example, features described in one exemplary embodiment may be incorporated into a different embodiment, such as the use of pressure sources.

In addition, modifications may be made to adapt a particular situation or material to the teachings of the subject disclosure without departing from the essential scope thereof. For example, the header can include a split reel rather than a single reel, the header may use different support arms for supporting the harvesting reel assembly, the harvesting reel assembly may have a different number of support members and/or extendable reel arms, and so forth. It is to be understood, therefore, that the exemplary embodiments are not limited to the particular aspects disclosed, but it is intended to cover modifications within the spirit and scope of the subject disclosure as defined by the appended claims.

We claim:

1. A harvesting reel assembly for a header of an agricultural harvester comprising:
a central rotatable shaft;
a plurality of support members extending widthwise across the reel assembly and connected to the central rotatable shaft for rotation therewith;
a cam assembly for guiding rotation of the plurality of support members;
a pressure source; and
a plurality of extendable reel arms circumferentially spaced apart from each other and in communication with the pressure source, at least one of the plurality of extendable reel arms comprising a first end engaged with the central rotatable shaft for rotation therewith and a distal end opposite the first end connected to one of the plurality of support members,
wherein the pressure source and the plurality of extendable reel arms maintain a substantially fixed pressure in a cavity extending between the plurality of extendable reel arms.

2. The harvesting reel assembly of claim 1, wherein each of the plurality of extendable reel arms includes a first end engaged with the central rotatable shaft for rotation therewith and a distal end opposite the first end for connection to one of the plurality of support members.

3. The harvesting reel assembly of claim 1, wherein each of the plurality of extendable reel arms moves between an extended position and a retracted position in response to engagement with the cam assembly.

4. The harvesting reel assembly of claim 1, wherein the at least one of the plurality of extendable reel arms includes at least one of an actuator, a biasing member, and a cylinder.

5. The harvesting reel assembly of claim 1, wherein the at least one of the plurality of extendable reel arms further includes a cam wheel engaging a cam track of the cam assembly.

6. The harvesting reel assembly of claim 5, wherein the cam wheel is positioned on the distal end of the at least one of the plurality of extendable reel arms.

7. The harvesting reel assembly of claim 5, wherein each of the plurality of support members are operatively engaged with the cam track.

8. The harvesting reel assembly of claim 1, wherein the pressure source is one of an air tank, a gas cylinder, and an accumulator operatively engaged with the plurality of the extendable reel arms for extending the plurality of the extendable reel arms.

9. The harvesting reel assembly of claim 8, wherein the accumulator is adjacent to the central rotatable shaft.

10. The harvesting reel assembly of claim 1, wherein the cam assembly includes a non-circular cam track.

11. The harvesting reel assembly of claim 1, further comprising an extendable spider arm extending between the central rotatable shaft and one of the plurality of support members.

12. A harvesting reel assembly for a header of an agricultural harvester comprising:
a central rotatable shaft;
a plurality of support members extending widthwise across the reel assembly and connected to the central rotatable shaft for rotation therewith;
a cam assembly for guiding rotation of the plurality of support members;
an extendable reel arm that includes a first end engaged with the central rotatable shaft for rotation therewith and a distal end opposite the first end connected to one of the plurality of support members; and
a pressure source that is one of an air tank, a gas cylinder, and an accumulator operatively engaged with the extendable reel arm for extending the extendable reel arm.

13. The harvesting reel assembly of claim 12, further comprising a plurality of extendable reel arms each including a first end engaged with the central rotatable shaft for rotation therewith and a distal end opposite the first end for connection to one of the plurality of support members.

14. The harvesting reel assembly of claim 12, wherein the extendable reel arm moves between an extended position and a retracted position in response to engagement with the cam assembly.

15. The harvesting reel assembly of claim 12, wherein the extendable reel arm includes at least one of an actuator, a biasing member, and a cylinder.

16. The harvesting reel assembly of claim 12, wherein the extendable reel arm further includes a cam wheel engaging a cam track of the cam assembly.

17. The harvesting reel assembly of claim 16, wherein the cam wheel is positioned on the distal end of the extendable reel arm.

18. The harvesting reel assembly of claim 16, wherein each of the plurality of support members are operatively engaged with the cam track.

19. The harvesting reel assembly of claim 12, further comprising a plurality of extendable reel arms circumferentially spaced apart from each other and in communication with the pressure source.

20. The harvesting reel assembly of claim 19, wherein the pressure source and the plurality of extendable reel arms maintain a substantially fixed pressure in a cavity extending between the plurality of extendable reel arms.

* * * * *